US010564626B2

(12) United States Patent
Nelaturi et al.

(10) Patent No.: US 10,564,626 B2
(45) Date of Patent: Feb. 18, 2020

(54) PLANNING OF COMPUTER NUMERICAL CONTROL (CNC) MACHINING OPERATIONS WITH THE AID OF A DIGITAL COMPUTER

(71) Applicant: Palo Alto Research Center Incorporated, Palo Alto, CA (US)

(72) Inventors: Saigopal Nelaturi, Palo Alto, CA (US); Christian Fritz, Mento Park, CA (US); Gregory Burton, Mountain View, CA (US); Tolga Kurtoglu, San Jose, CA (US)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 502 days.

(21) Appl. No.: 15/011,312

(22) Filed: Jan. 29, 2016

(65) Prior Publication Data

US 2017/0220028 A1    Aug. 3, 2017

(51) Int. Cl.
*G05B 19/4097* (2006.01)
*G05B 19/4093* (2006.01)

(52) U.S. Cl.
CPC ..... *G05B 19/4097* (2013.01); *G05B 19/4093* (2013.01); *G05B 2219/32099* (2013.01); *Y02P 90/265* (2015.11)

(58) Field of Classification Search
CPC .. G01D 5/14; G05B 19/4097; G05B 19/4093; G05B 2219/32099; Y02P 90/265
See application file for complete search history.

(56) References Cited

U.S. PATENT DOCUMENTS 4,618,924 A    10/1986 Hinds
5,091,861 A *   2/1992 Geller ................ B23Q 3/15706
                                                    700/192
(Continued)

OTHER PUBLICATIONS

W. Fu et al., "A Graph Grammar Based Approach to Automated Manufacturing Planning," Proc. ASME 2012 Int'l Design Engr. Tech. Confs. & Comps. and Info. in Engr. Conf. (Aug. 12-15, 2012).

(Continued)

*Primary Examiner* — Vongsavanh Sengdara
(74) *Attorney, Agent, or Firm* — Patrick J. S. Inouye; Leonid Kisselev

(57) ABSTRACT

A Web-based system and method creates one or more qualitatively distinct process plans for machining a part. The surfaces of the part are modeled and parameters for a plurality of CNC machining tools are obtained, including the orientations along which the tool cuts away raw material. A maximal set of translations for each tool is also obtained, where each translation includes a collision-free orientation of the tool and a maximal machinable volume of material removable from the part in that orientation. A search engine navigates through a hierarchically-structured search space that starts at an initial state and transitions to successive states based on actions that satisfy a cost constraint function. Each state and each action includes a tool, orientation of the tool, and a maximal machinable volume. The search ends when a goal condition is satisfied. The actions constitute the process plan.

23 Claims, 8 Drawing Sheets

(56) References Cited

U.S. PATENT DOCUMENTS

| | | | |
|---|---|---|---|
| 5,351,196 A * | 9/1994 | Sowar | G05B 19/4097 345/420 |
| 5,546,314 A | 8/1996 | Brost et al. | |
| 5,710,709 A | 1/1998 | Oliver et al. | |
| 5,856,924 A | 1/1999 | Brost et al. | |
| 6,632,053 B2 | 10/2003 | Koch | |
| 6,862,560 B1 | 3/2005 | Edwards et al. | |
| 7,024,272 B2 | 4/2006 | Thomas et al. | |
| 7,065,420 B1 | 6/2006 | Philpott et al. | |
| 7,103,519 B2 | 9/2006 | Singarajan et al. | |
| 7,496,420 B2 | 2/2009 | Red et al. | |
| 8,060,237 B2 | 11/2011 | Franzen et al. | |
| 8,095,229 B2 * | 1/2012 | Muser | G05B 19/41805 700/96 |
| 8,253,730 B1 | 8/2012 | Carr | |
| 8,978,480 B2 | 3/2015 | Michopoulos et al. | |
| 2001/0018312 A1 * | 8/2001 | Gottschalk | B24B 9/148 451/5 |
| 2002/0095236 A1 * | 7/2002 | Dundorf | G05B 19/4069 700/182 |
| 2003/0204284 A1 | 10/2003 | Thomas et al. | |
| 2003/0204285 A1 | 10/2003 | Thomas et al. | |
| 2004/0186612 A1 | 9/2004 | Edwards et al. | |
| 2006/0155402 A1 | 7/2006 | Read | |
| 2008/0091394 A1 * | 4/2008 | Hahn | G05B 19/4069 703/7 |
| 2008/0134589 A1 | 6/2008 | Abrams et al. | |
| 2009/0030661 A1 | 1/2009 | Bouffiou et al. | |
| 2013/0116990 A1 | 5/2013 | Montana et al. | |
| 2014/0163720 A1 * | 6/2014 | Nelaturi | G06T 15/40 700/186 |
| 2014/0277660 A1 * | 9/2014 | Nelaturi | B23Q 3/103 700/97 |

OTHER PUBLICATIONS

D. Vukelic et al., "A Rule-Based System for Fixture Design," Sci. Research and Essays, vol. 6(27), pp. 5787-5802 (2011).
H.T. Ilies et al., "Dual of Sweep," Comp. Aid. Design, 31(3)185-201 (1999).
X. Kang et al., "Recent Research on Computer-Aided Fixture Planning," Recent Patents on Mechanical Engr., vol. 2, pp. 8-18 (2009).
S. Nelaturi et al., "Solving Inverse Configuration Space Problems by Adaptive Sampling," Symp. Solid & Phys. Model. 2012 (2012).
S. Nelaturi et al., "Configuration Products and Quotients in Geometric Modeling," Comp. Aid. Design (2012).
S. Nelaturi et al., "Rapid Mapping and Exploration of Configuration Space," Proc. ASME 2011 Int'l Design Engr. Tech. Confs. & Comps. and Info. in Engr. Conf. (Aug. 29-31, 2011).
B. V. Blarigan et al., "Automated Estimation of Time and Cost for Determining Optimal Machining Plans," Proc. ASME 2012 Int'l Design Engr. Tech. Confs. & Comps. and Info. in Engr. Conf. (Aug. 12-15, 2012).
J.A. Carter et al., "3-Axis CNC Path Planning Using Depth Buffer and Fragment Shader," Comp. Aid. Design and Applications (2008).
A. A. Eftekharian et al., "Draft: Convex Decomposition of 3D Solid Models for Automated Manufacturing Process Planning Applications," Proc. ASME 2012 Int'l Design Engr. Tech. Confs. & Comps. and Info. in Engr. Conf. (Aug. 12-15, 2012).
M. Lysenko et al., "Group Morphology with Convolution Algebras," Spatial Automation Laboratory University of Wisconsin—Madison.
C.B. Barber et al., "Qhull," (1995) (/www. geom. umn. edu/software/qhull), operated by the University of Minnesota, Minnesota, MN University of Minnesota.
B. Naylor et al., "Merging BSP Trees Yields Polyhedral Set Operations," ACM SIGGRAPH Comp. Graphics, vol. 24(4), pp. 115-124 (1990).
Carr Lane Modular Fixturing manual, www.carrlane.com.
ZM BI and WJ Zhang, "Flexible Fixture Design and Automation: Review, Issues and Future Directions." International Journal of Production Research, 39(13):2867-2894, 2001.
A. Bicchi and V. Kumar, "Robotic Grasping and Contact: A review." In Robotics and Automation, 2000. Proceedings. ICRA'00. IEEE International Conference on, vol. 1, pp. 348-353. IEEE, 2000.
R. C. Brost et al., "A CAD Tool That Automatically Designs fixtures and Pallets." Presented at AUTOFACT'95, Chicago IL, Nov. 1995.
D. Ding et al., Computation of Fingertip Positions for a Form-Closure Grasp. Proceedings of the 2001 IEEE International Conference on Robotics & Automation, pp. 2217-222., Seoul, Korea, May 21, 2004.
B. Mishra et al., "On the Existence and Synthesis of Multifinger Positive Grips." Algorithmica, 2(1):541-558, 1987.
V.D. Nguyen, "Constructing Force-Closure Grasps." The International Journal of Robotics Research, 7(3):3-16, 1988.
E. Rimon et al., "On Force and Form Closure for Multiple Finger Grasps." In Robotics and Automation, 1996. Proceedings., 1996 IEEE International Conference on, vol. 2, pp. 1795-1800. IEEE, 1996.
J. C. Trappey et al., A Literature Survey of Fixture Design Automation. The International Journal of Advanced Manufacturing Technology, 5(3):240-255, 1990.
J.C. Trinkle, A Quantitative Test for Form Closure Grasps. In Intelligent Robots and Systems, 1992., Proceedings ot the 1992 IEEE/RSJ International Conference on, vol. 3, pp. 1670-1677, Jul. 1992.
A. S. Wallack et al., "Planning for Modular and Hybrid Fixtures." Algorithmica, 19(1):40-60, 1997.
M. Y. Wang, "An Optimum Design for 3-D Fixture Synthesis in a Point Set Domain." Robotics and Automation, IEEE Transactions on, 16(6):839-846, 2000.
C. Wentink et al., "Algorithms for fixture design." Citeseer, 1996.
Y. Zheng et al., "A Fast N-Dimensional Ray-Shooting Algorithm for Grasping Force Optimization." In Robotics and Automation (ICRA), 2010 IEEE International Conference on, pp. 1300-1305. IEEE, 2010.
Y. Zheng et al., "Efficient Simplex Computation for Fixture Layout Design." Computer-Aided Design, 43(10):1307-1318, 2011.
B. Babic et al., A review of automated feature recognition with rule-based pattern recognition. Comput. Ind., 59(4):321-337, 2008.
SK Gupta et al., Automated manufacturability analysis: a survey. Research in Engineering Design, 9(3):168-190, 1997.
J-H Han et al., Manufacturing feature recognition from solid models: a status report. Robotics and Automation, IEEE Transactions on, 16(6):782-796, 2000.
T. Lozano-Perez, Spatial planning: A configuration space approach. Computers, IEEE Transactions on, 100(2):108-120, 1983.
M. Lysenko et al., Group morphology with convolution algebras. In ACM Symposium on Solid and Physical Modeling 2010, 2010.
S. Nelaturi et al., Automated fixture configuration for rapid manufacturing planning. Comput.-Aided Des., 46:160-169, 2014.
Ira Pohl, Heuristic search viewed as path finding in a graph. Artif. Intell., 1(3):193-204, 1970.
Aag Requicha, Representations of rigid solid objects. Springer, 1980.
JJ Shah, Assessment of features technology. Comput.-Aided Des., 23(5):331-343, 1991.
TC Woo, Visibility maps and spherical algorithms. Comput.-Aided Des., 26(1):6-16, 1994.
M-C Wu etal., Analysis on machined feature recognition techniques based on b-rep. Comput.-Aided Des., 28(8):603-616, 1996.
Kyoung Hung Kim, A System for Automated Fixture Planning with Modular Fixtures, May 1993, The Robotics Institute Carnegie Mellon University Pittsburgh, Pennsylvania 15213, CMU-RI-TR-93-27.

* cited by examiner

PLANNING OF COMPUTER NUMERICAL CONTROL (CNC) MACHINING OPERATIONS WITH THE AID OF A DIGITAL COMPUTER

FIELD

This application relates in general to computer-aided process planning and, in particular, to a method for planning of computer numerical control (CNC) machining operations with the aid of a digital computer.

BACKGROUND

The machining of a part from raw stock or material, such as metal, is a form of subtractive manufacturing during which raw material is progressively removed from the part until the part reaches an intended shape and size. The machining generally reduces the raw material to a rough form within a specified tolerance; further manufacturing processes may be required to smooth, polish, finish, or otherwise transform the part into a final form of completion.

Machining primarily involves turning, drilling and milling the raw material into the part desired. The operations respectively remove the raw material by rotating the part against a stationary cutting tool, axially boring holes using a rotating bit with a cutting edge on a distal end whilst the raw material is held stationary, and cutting away the raw material using a rotating bit with cutting edges along the rotating bit's sides and distal end. In drilling and milling, a rotating bit along a longitudinal axis in the Z-dimension. Milling additionally involves moving the rotating bit along a plane in the X- and Y-dimensions. Other kinds of machining operations and tools exist.

Machining has benefited from the increased integration of computerization into various stages of the manufacturing process. For instance, a part can first be digitally represented through an electronically-stored model output from a computer-aided design (CAD) program. Computer-aided manufacturing (CAM) software uses a part's digital model, such as generated by a CAD program, and a model of the manufacturing setup to create a set of machining instructions. These instructions, following automated post-planning process validation, can be used to program digitally-automated milling machines to manufacture the part from raw materials using computer numerical control (CNC) machining instructions.

Despite the advances in parts design and manufacturing planning made possible by CAD, CAM and related software tools, conventional efforts in these areas still focus primarily on automating the validation of human-generated manufacturing process plans in an effort to better support efficient integration between product lifecycle management and physical shop floor production. In general, these software tools provide virtual environments that facilitate the modeling, planning, simulation, and analysis of manufacturing processes post facto, as supported by algorithms for path planning, collision detection, cycle time calculations, layout modeling and resource allocation, and validating user-driven inputs, ranging from a single operation to an entire manufacturing program.

Several problems remain in the task of validating manufacturing process plans that define a sequence of machining instructions, such as expressible by a CNC program, to produce parts from raw stock. First, depending upon a part's complexity, attempting the task manually and without automation may be time-consuming, expensive and impracticable. Further, the effort can occupy a large segment of the process planning stage and will invariably require human intervention, creativity and experience to sufficiently refine proposed process plans before their execution can be validated with digital manufacturing tools.

The inverse problem that of defining a process plan for manufacturing a part from raw stock through digitally-automated machining, is likewise ill-posed. Conventional solutions for producing process plans for manufacturing parts with arbitrary geometric complexity using a selection of different tools fail to resolve these problems. A process plan solution may not exist if the part is non-manufactureable, or multiple feasible process plan solutions may exist if the part is manufactureable. The problem space of solutions grows as the geometric complexity of the part and the selection of available machining tools increase. Furthermore, process plans are influenced by machine-specific parameters, including tool poses or orientations; layout planning, including staging models of the uncut raw material that remains before a machining operation; constraints affected by fixture and tool setup times and costs; overall manufacturing time; design tolerances; and so forth. The potential solution space can rapidly become intractable as the number of machining tools and required directions of access to the raw material increase. For instance, process planning in a search space having only eight required access directions and five tools has a ramification factor of 40, which means that there are $40^{10}$>1e16 different process plans of length ten.

Conventional solutions to process planning rely on the use of machining features, which are subsets of solid design models that are parameterized and annotated with manufacturing information. Process planners use the solid models to recognize and extract features; the extracted features are mapped to a relevant set of manufacturing processes. Most feature recognition techniques are restricted to pocket milled, drilled and turned features in which accessibility analysis outlines candidate sets of orientations in which a part may be machined. When parts can be fabricated by independently machining all recognized features, these types of process planners can be quite effective. However, feature-based process planning is unable to scale up to a large class of parts, especially when designs consist of interacting features, machinable regions not classified as manufacturing features, or regions requiring combinations of machining operations in multiple orientations. In these cases, when the volume to be machined has to be decomposed into features, the subvolumes may not be manufactureable, or could be difficult to identify as being manufactureable; moreover, alternate decompositions of a solid model into features could yield different and inconsistent results, which can complicate and confuse process planning.

Therefore, a need remains for an approach to creating and implementing process plans for manufacturing machining operations that accommodate machine-specific and staging model-specific parameters and manufacturing cost constraints while efficiently scaling as part design complexity increases.

SUMMARY

A Web-based system and method creates one or more qualitatively distinct process plans for machining a part. The surfaces of the part are modeled and parameters for a plurality of CNC machining tools are obtained, including the orientations along which the tool cuts away raw material. A maximal set of translations for each tool is also obtained, where each translation includes a collision-free orientation of the tool and a maximal machinable volume of material removable from the part in that orientation. A search engine navigates through a hierarchically-structured search space that starts at an initial state and transitions to successive states based on actions that satisfy a cost constraint function. Each state and each action includes a tool, orientation of the tool, and a maximal machinable volume. The search ends when a goal condition is satisfied. The actions constitute the process plan.

One embodiment provides a system and method for planning of CNC machining operations with the aid of a digital computer. A computer that includes a processor, memory and storage is provided with a geometric model of a part to be machined. The geometric model defines the surfaces of the part. The computer is also provided with parameters for a plurality of CNC machining tools. The parameters for each tool includes a plurality of orientations at which the tool is able to longitudinally traverse a rotating cutting edge. The computer is further provided with a maximal set of translations for each of the tools. Each translation includes one of the orientations of the tool where the tool's orientation will avoid collisions between the rotating cutting edge and the surfaces of the part and a maximal sub-volume of material removable from the part by the tool in the tool's orientation for the translation. A set of states is represented in the computer. Each state identifies one of the tools, one of the orientations of the tool, and describing a negative volume of the part, with one of the states representing an initial state. A set of actions is also represented in the computer. Each action identifies one of the tools, one of the orientations of the tool, and describing the maximal sub-volume of material removable from the negative volume of the part in one of the states by the tool in the tool's orientation. A search engine repetitively transitions, starting at the initial state, from one of the states to another of the states by choosing one of the actions as guided by a heuristic that is based on aggregate cost and the negative volume that remains after subtracting the maximal sub-volume for the action chosen. A process plan is formed and includes each of the actions chosen when the negative volume that remains is minimal. The tool is programmed with the process plan downloaded by the computer and includes machining operations by the tool based on the process plan. Finally, the tool is operated per the machining operations in the downloaded process plans by machining off the part the maximal sub-volumes through traversals of the rotating cutting edge over the surfaces of the part.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Traditionally, product design and manufacture within an organization are operated as closely-related, yet functionally separate spheres of activity. The design of a product is treated as a discrete output from a design department. Thus, product conception and design usually occur first, followed by product realization and manufacture. If a product design is deemed manufactureable, process plans for manufacturing are synthesized and validated between the conclusion of product design and commencement of product manufacturing.

Figure 1:
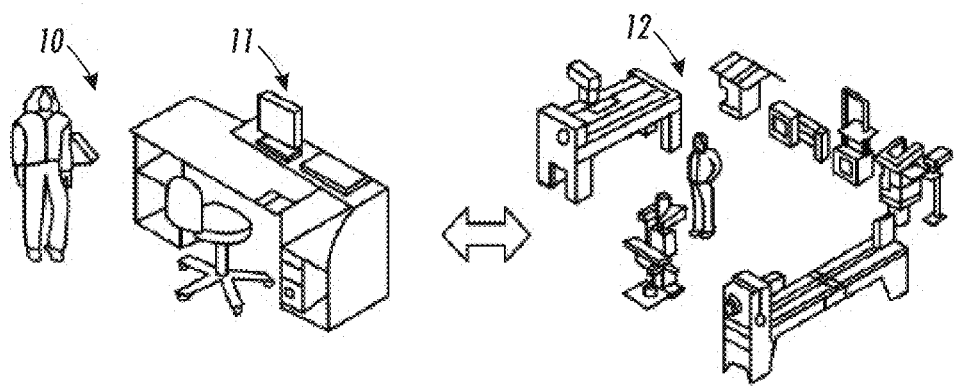
FIG. 1 is a functional block diagram showing, by way of example, a prior art system for validation of human-generated manufacturing process plans.

Conventional approaches to synthesizing manufacturing process plans strive to better integrate product lifecycle management and physical shop floor production, while inadvertently underscoring the distinctions between design and manufacture. FIG. 1 is a functional block diagram showing, by way of example, a prior art system 10 for validation of human-generated manufacturing process plans. Although manufacturability is usually evaluated following initial design during a subsequent stage in the product lifecycle, a product design may nevertheless have to be iterated between a design department 11 and a manufacturing department 12 until the designed part has ultimately been determined to be manufactureable. This back-and-forth cycling between part design and manufacturing occurs as a natural outgrowth of the business activities responsible for their respective execution.

The part design and manufacturing iterations required to perform validation of human-generated manufacturing process plans can be particularly time-consuming and expensive. Each iteration chews up valuable time that can destroy market lead or innovative advantage, which in turn can result in decreased sales and lowered revenue. Moreover, despite the investment of time and money in validating human-generated manufacturing process plans, the validated plans may not necessarily be qualitatively optimal, especially in an organization where the resources or time to devise and validate innumerable and feasible manufacturing process plans are limited or unavailable.

Figure 2:
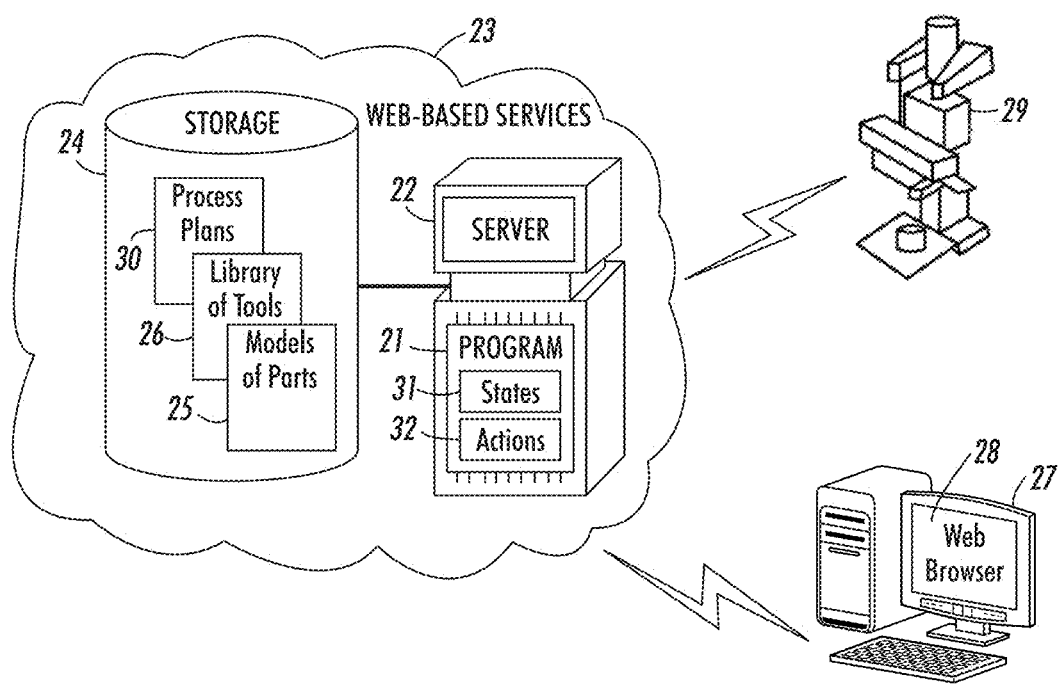
FIG. 2 is a functional block diagram showing a system for planning of CNC machining operations with the aid of a digital computer in accordance with one embodiment.

Manufacturability analysis, during which a part is found to either be manufactureable or not, and manufacturing process planning are complex problems that rely on advanced geometric reasoning at the part level. Manufacturing process planning, though, is an inverse problem to manufacturability analysis, where multiple feasible solutions to machining a part could exist if the part is deemed to be manufactureable. FIG. 2 is a functional block diagram showing a system 20 for planning of CNC machining operations with the aid of a digital computer 27 in accordance with one embodiment. A Web-based service 23 generates and visualizes several qualitatively distinct fabrication plans, which can be sent to a tool path planner to generate CNC machining instructions. A machining tool 29 can then be programmed with the machining instructions and operated to machine the surfaces of the part.

A program 21 is provided to users through a centralized server 22. Access is provided via the Web using wired or wireless connections. The centralized server 22 can be remotely accessed over a wide area public data communications network, such as the Internet, or locally accessed over a local area network. Users interface with the server 22 through a Web browser 28 executing on a personal computer 27 or similar device. In a further embodiment, the centralized server 22 can also remotely access one or more machining tools 29 over the wide area public data communications network or via a dedicated connection.

The server 22 is operatively coupled to a storage device 24 which stores models of parts 25 represented using conventional geometric model representations, such as features, slices, polygons, voxels, or other volumetric units, and a library of machining tools 26. Both the server 22 and personal computer 27 include components conventionally found in general purpose programmable computing devices, such as a central processing unit, memory, input/output ports, network interfaces, and non-volatile storage, although other components are possible. In addition, other computational components are possible.

The program 21 implements a search engine that executes a spatial planning tool that generates machining plans with stable fixtures to fabricate complex geometries, as further described infra. Briefly, the program 21 navigates through a search space containing a set of states 31 that is structured in a hierarchy. Starting at an initial state, the program 21 successively transitions to another state in the hierarchy by selecting a suitable action from a set of actions 32. The search engine as guided in choice of action by a heuristic, such as a cost constraint for minimizing manufacturing time and cost. The search continues to iteratively transition to further states until a goal condition is realized.

The program 21 accesses a library of machining tools 26 with specifications for each operable tool 29, and the program 21 connects the available capability of each tool 29 to the uploaded geometric model of each part 25 to provide qualitatively distinct process plans, represented in the form of a JSON ("JavaScript Object Notation") file or similar structured encoding or human-readable format, with detailed feedback for each individual plan.

The program 21 uses geometric reasoning algorithms with tooling information from the library 26 to construct the search space using maximal machinable volumes from the part stock for each tool orientation, such as described in commonly-assigned U.S. Pat. No. 9,292,626, issued Mar. 22, 2016, the disclosure of which is incorporated by reference. Preliminarily, collision-free rigid motions of the machining tools 29 are defined and computed in a configuration space SE(3) of rigid motions. Subsets of SE(3) are termed filters. Two important operations are used to relate solids and filters:

Dilation, or sweep, of a solid X by a filter $\mathcal{M}$ is defined as $\delta(\mathcal{M}, X) = \bigcup_{m \in \mathcal{M}} X_m$ where $X_m$ represents the solid X transformed by a rigid transformation m.

Configuration space obstacle $S \boxtimes T$ of solids S, T is the filter consisting of all transformations of the moving solid T that cause collision with the stationary solid S. Every $h \notin S \boxtimes T$ is said to be feasible. When the moving solid T is translating in a fixed orientation, the filter $S \boxtimes T = S \oplus T^{-1}$ is the translational configuration space obstacle of S and T, seen in robot motion planning problems. Here, $\oplus$ denotes the Minkowski sum and $T^{-1}$ represents the scaling of all coordinates in T by −1.

The set of actions 32 include the maximal sub-volume that is machinable from raw stock for a particular tool 29 in a given orientation. Each staging model, which is the remaining uncut metal of a part under manufacture before a machining operation, is typically re-fixtured in several orientations to enable the cutting tool 29 to machine the entire part surface. Standard accessibility analysis techniques are used to determine the orientations to be used in the program 21. Given a pair (S, P), where S represents a fixtured raw stock or a staging model and P represents the part to be manufactured, let T represent the tool 29 that is selected to machine P from S.

A maximal machinable volume represents the largest subset of S that may be removed by T without interfering with P. To simplify exposition, consider the problem of determining the maximal machinable volume from a stationary stock using a translating tool 29. This situation is manifested in practice, for example, when three-axis milling machines are used to cut metal from fixtured stock. The configuration space of the unconstrained tool 29 is $\mathbb{R}^3$.

For the part P to be manufacturable, S is placed within the set of positions that a reference point on the tool T can reach in a given orientation. The maximal filter of feasible transformations applicable to the tool 29 to avoid cutting into P is the complement of the configuration space obstacle, expressed as:

$$\mathcal{F} = (P \oplus T^{-1})^c \qquad (1)$$

Equation (1) outlines the largest subset of $\mathbb{R}^3$ that is applicable to the tool 29 in the chosen orientation. However, in practice, machining is limited by the workspace available, or the set of positions and orientations achievable by the tool 29. In a situation involving a fixed orientation, only the set of all reachable positions or the reachable workspace of the tool 29 are of concern. Denoting the reachable workspace as $\mathcal{R}$, the maximal set $\kappa \subset \mathbb{R}^3$ of translations applicable to to tool 29 is revised as:

$$K = \mathcal{F} \cap \mathcal{R} \qquad (2)$$

where K is the maximal filter representing all translations applicable to the tool T without interfering with the part P. The dilation $\delta(K,T)$ represents the sweep of the tool 29 by the maximal filter within the workspace without interfering with P. The maximal volume machinable from the raw stock (or a staging model) S is given by:

$$\mathbb{V} = \delta(K,T) \cap S \qquad (3)$$

Assume that a tool T moves according to transformations in a filter W, called the workspace, which is a full-dimensional subset of SE(3). The reachable workspace $\mathcal{R}$ is the projection of W into $\mathbb{R}^3$ and represents all of the positions that can be achieved by some orientation of the tool T.

The positions and orientations achievable by the tool T during its motion are described in terms of the location of a coordinate frame attached to the tool T Assuming this frame is initially aligned with a global reference frame with respect to which transformations are described. The filter W also describes the positions and orientations of the tool 29 with respect to the absolute frame of reference. The origin of each frame is the reference point of T and indicates the special point of contact between the tool T and the stock which will be used to outline the allowable spatial locations of the tool T for manufacturability.

The maximal volume that is machinable from a raw stock by a rotating and translating T is formulated by extending Equations (1) and (2) to SE(3). Computations in SE(3) can be broken down into smaller three-dimensional computations owing to the product structure of SE(3)=$\mathbb{R}^3 \rtimes$ SO(3), where SO(3) represents the group of spatial rotations. In practice, the maximal filter applicable to T to avoid cutting into P can be expressed as:

$$\mathcal{F} = \bigcup_{r \in SO(3)} (P \oplus T_r^{-1})^c \quad (4)$$

Equation (4) suggests that to compute all (six-dimensional) non-colliding tool motions, the tool 29 must be rotated according to orientations r in the workspace and Equation (2) must be repeatedly computed to accumulate three-dimensional maximal machinable volumes.

In high-axis machining, available machine tool orientations are typically provided per axis. In addition to having three translational motions, five-axis machines have rotational degrees of freedom about two-axes of rotation. If rotations about the available axes are denoted $\mathcal{O}_\theta$ and $\mathcal{O}_\phi$, the subset of SO(3) for which Equation (4) needs to be computed is given by $\mathcal{O} = \bigcup_{\theta \in \mathcal{O}_\theta, \phi \in \mathcal{O}_\phi} (\theta \cdot \phi) \cup (\phi \cdot \theta)$ owing to the non-commutativity of spatial rotation composition. Here · represents composition of rotations, for example, by matrix or quaternion multiplication.

Minkowski sum, dilation, and configuration space obstacle calculation operations form a large body of research in solid modeling due to their applications in spatial planning. In general, boundary representations of these shapes are harder to compute than lower level representations, such as sampled point sets. Using implicit representations of shapes on sampled regular grids can provide a unified framework in which to use the properties of convolutions, Fourier transforms, and other signal and image processing algorithms to implement these operations. In the general case where no assumptions are made on part and tool geometry, these algorithms can be efficiently applied to compute maximal machinable volumes by directly implementing Equations (3) and (4).

An algorithm to compute Equation (1) when T is a translating axisymmetric milling tool 29 that does not possess undercut features when viewed along its spin axis will now be described. Many cutting tools, such as end mills and ball mills, are built without such undercut features, so the special case has significant practical value. Furthermore, the described implementation of the algorithm exploits dimensional reduction that results in faster performance in practice when compared to full-dimensional computations.

Figure 3:
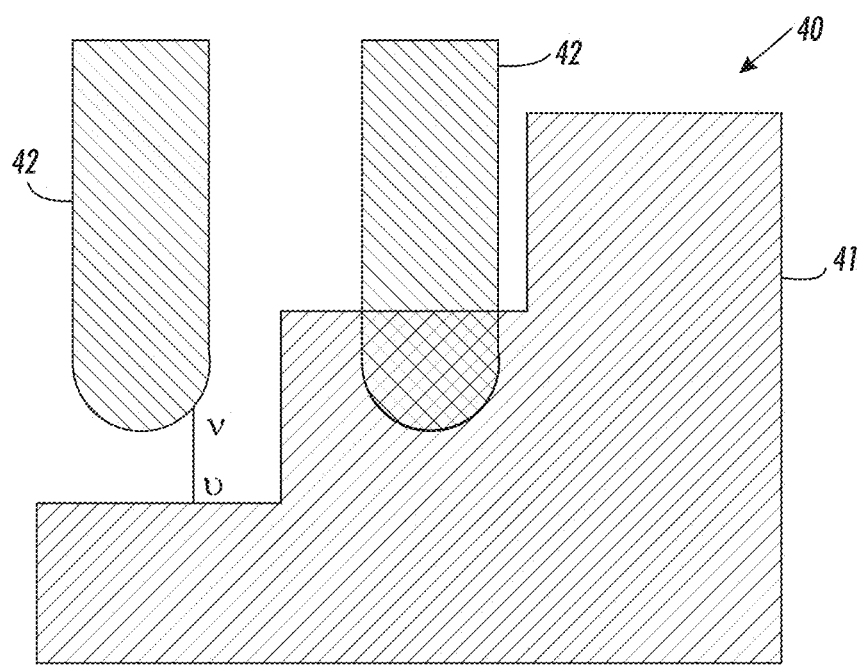
FIG. 3 is a diagram showing, by way of example, visibility from the vantage point of a tool.
Figure 4:
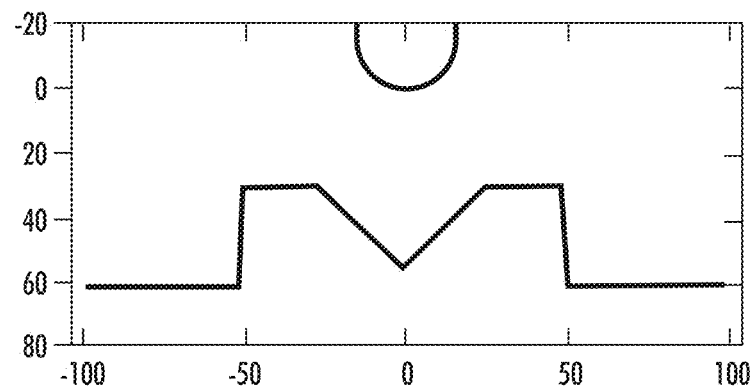
FIGS. 4-9 are diagrams showing, by way of examples, sweep calculations using heightmaps.
Figure 5:
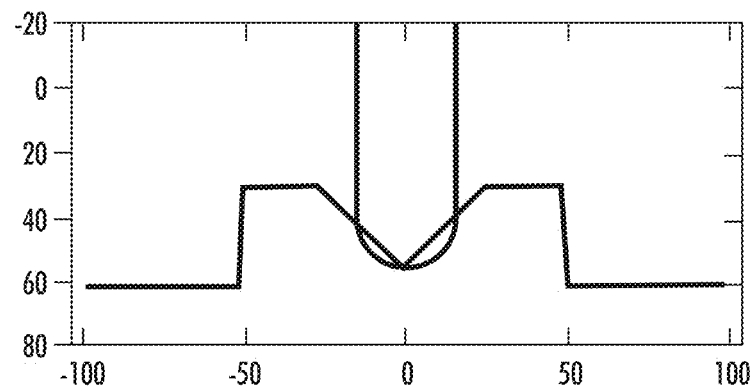
Figure 6:
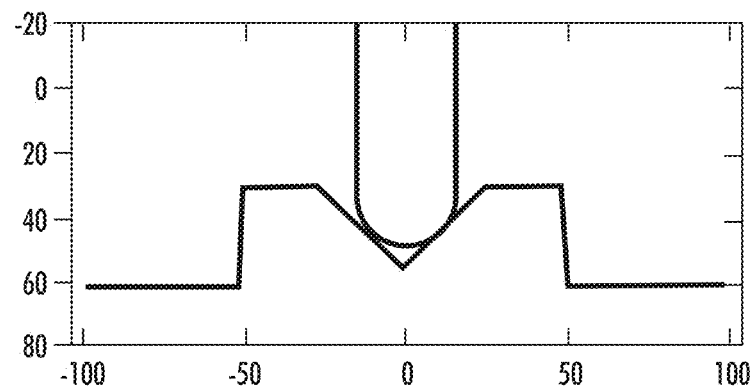
Figure 7:
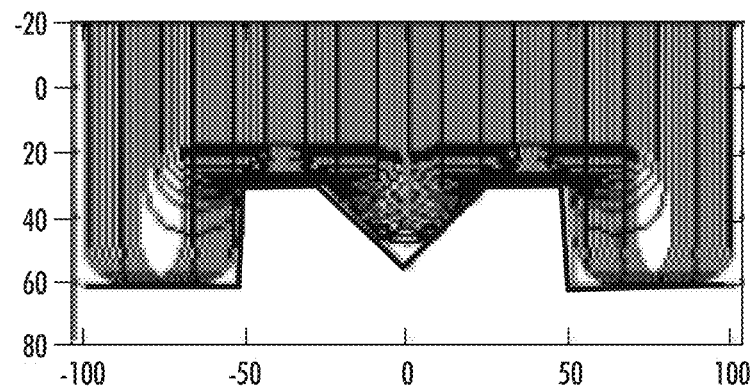
Figure 8:
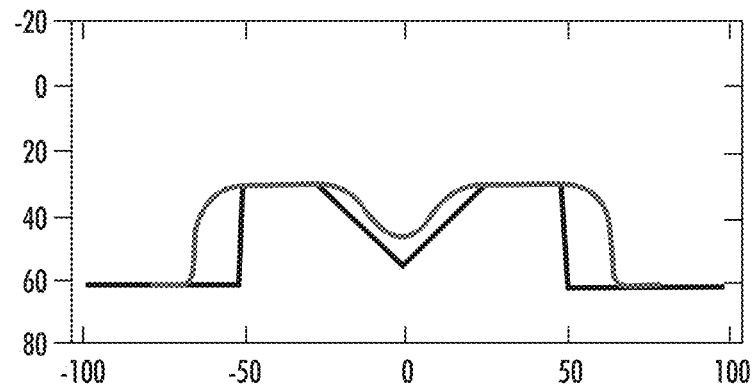
Figure 9:
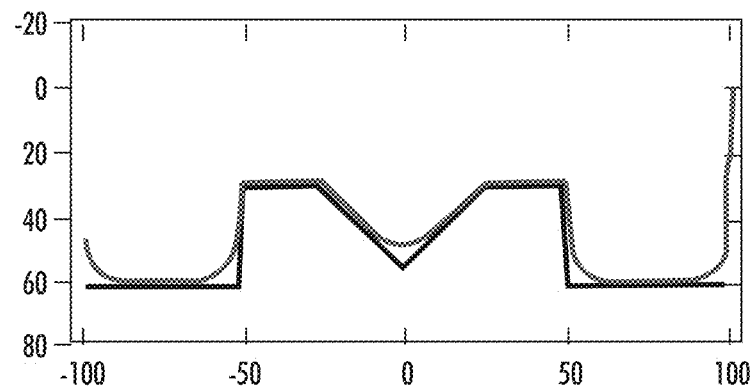

Consider a feasible translation of an oriented undercut-free tool T. At every point $v \in \partial T$, there exists a $u \in \partial P$, such that the vector v−u is parallel to the spin axis and the segment $\lambda v + (1-\lambda)u$, $\lambda \in [0,1]$ is entirely in $P^c$. FIG. 3 is a diagram showing, by way of example, visibility 43 from the vantage point of a tool 42. When in the position on the left, every such u on the surface of the part 41 is said to be visible from the tool 42. When in the position on the right, those positions on the surface of the part 41 that are not visible from the tool 42 are termed $\lambda \notin [0,1]$.

The distance between v and u can be computed using height maps. The value of the height map at a point q on a plane with normal parallel to the spin axis is the distance from q to the point $p \in \partial P$ visible from q. In one embodiment, height maps can be implemented using standard z-buffer hidden surface removal with orthographic projection, where the height map is computed on the camera plane located at infinity.

An infinitesimally-thin tool can be represented as a ray, in which case the height map of the part represents the maximum collision-free translation along the tool spin axis for every point (x,y) on the camera plane. FIGS. 4-9 are diagrams showing, by way of examples, sweep calculations using heightmaps. For a tool with thickness, the height map of the part is an upper bound on the possible collision-free translation. By moving away from the part, an infinitely long undercut free tool can only transition from a colliding to a non-colliding state. Therefore, the maximum collision-free translation of the tool along z can be determined by starting at the visible surface of the part, determined by the z-buffer algorithm, and translating away from the part by the maximum penetration depth, which is respectively depicted with reference to FIGS. 4-9.

After computing the maximum feasible translation of the tool 29 for every (x,y), which implements Equation (2), the heightmap is dilated by the heightmap of the tool 29 to get the heightmap of the sweep of the tool 29, that is, the heightmap $R_H(x,y)$ of the removal volume. By ignoring rotation about the tool's spin axis due to axisymmetry, or when the tool 29 is represented by its rotational sweep about the spin axis, a degree of freedom is removed and the height map can be implemented in two dimensions using standard image processing algorithms. The maximal machinable volume is the set of all points (x,y,z), where $z \leq R_H(x,y)$. Therefore, a three-dimensional representation of the maximal machinable volume, per Equation (3), can be obtained using image calculations. Note that while z-buffer algorithms have been used to compute rasterized tool paths after process planning, the representation of maximal machinable volume is used as the input to a search algorithm that rapidly evaluates process plans that may be then fed to a tool path planning algorithm.

Figure 10:
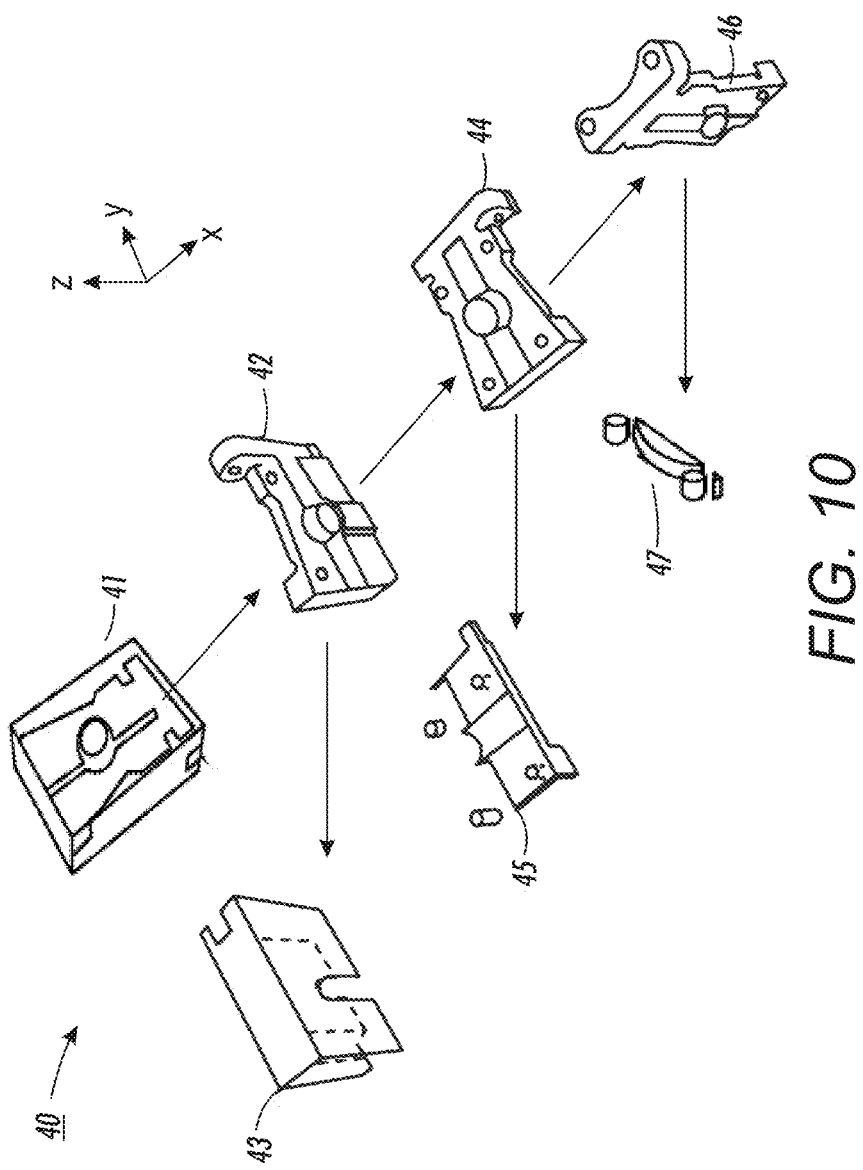
FIGS. 10 and 11 are diagrams showing, by way of examples, two searches that respectively represent different valid process plans starting from the same initial state and ending at the goal condition.
Figure 11:
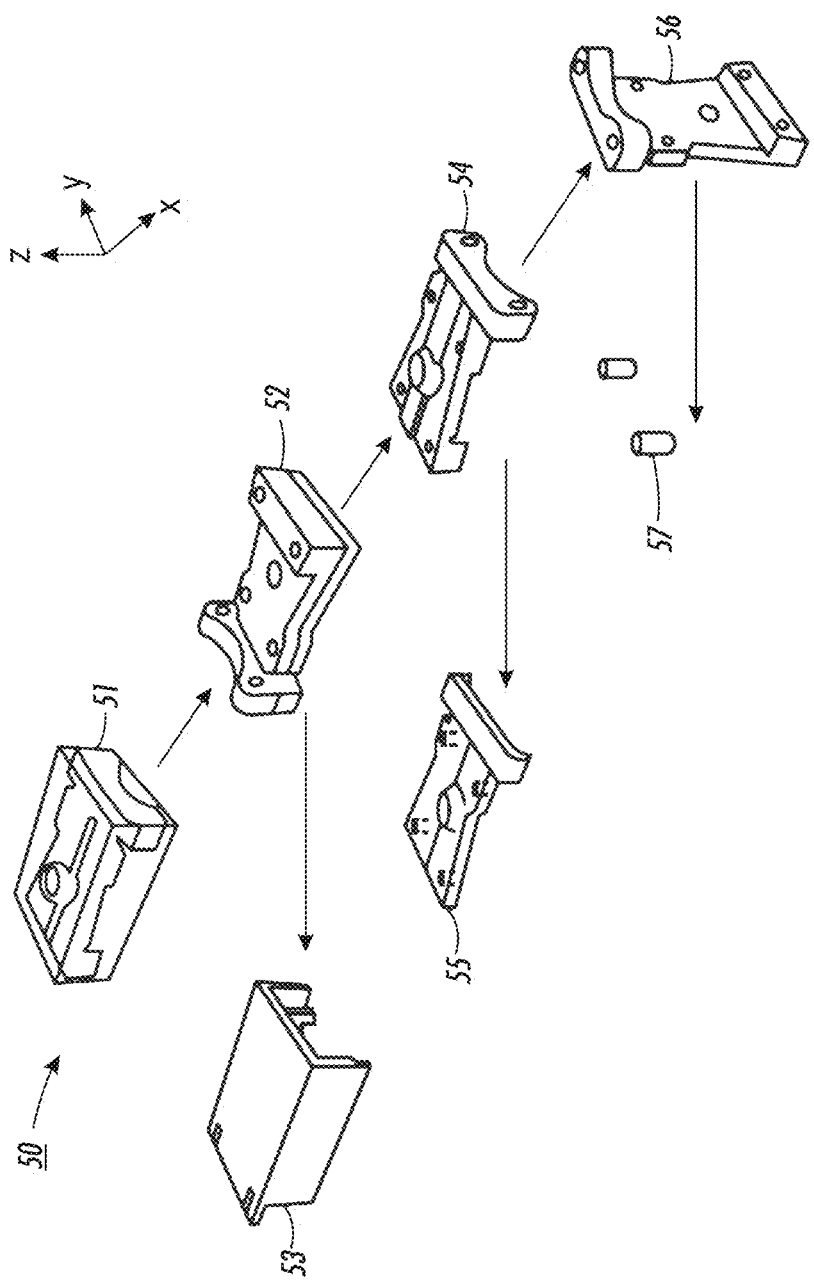

Generating a valid process plan can be cast as a planning problem that can be solved using a variant of the weighted A* search algorithm. The search finds a sequence of actions from a set of available actions A, called the plan. The search starts from a known initial state I and repetitively transitions to successive states by choosing one of the available actions until reaching a state where a goal condition G(s) is met. At each transition, the choice of action is constrained by a cost function G(a,s) that describes the cost of executing a particular action a in a particular state s. FIGS. 10 and 11 are diagrams showing, by way of examples, two searches 40, 50 that respectively represent different valid process plans starting from the same initial state and ending at the goal condition. Referring first to FIG. 10, in the first search 40, raw stock represents the initial state 41. An action that results in the raw stock being reoriented 90° about the y-axis is selected, which results in a succeeding state 42 in which a staging model represents the part after the selected action's maximal machinable volume 43 has been removed. A further action that results in the staging model once again being reoriented 90° about the y-axis is selected, which results in a succeeding state 44 in which a staging model represents the part after the further selected action's maximal machinable volume 45 has been removed. Finally, a final action that results in the staging model being reoriented 90° about the x-axis is selected, which results in a final state 46 in which a staging model represents the finished part after the final selected action's maximal machinable volume 47 has been removed. Referring next to FIG. 11, in the second search 50, raw stock represents the initial state 51. An action that results in the raw stock being reoriented 180° about the x-axis is selected, which results in a succeeding state 52 in which a staging model represents the part after the selected action's maximal machinable volume 53 has been removed. A further action that results in the staging model once again being reoriented 180° about the x-axis is selected, which results in a succeeding state 54 in which a staging model represents the part after the further selected action's maximal machinable volume 55 has been removed. Finally, a final action that results in the staging model being reoriented 90° about the x-axis is selected, which results in a final state 56 in which a staging model represents the finished part after the final selected action's maximal machinable volume 57 has been removed. In this example, two qualitatively distinct fabrication plans have been found and can be sent to a tool path planner to evaluate and ultimately generate CNC machining instructions.

A state S is a tuple $\langle V,T,\theta \rangle$, where V is a volume describing the remaining material to be removed, T is the current tool (or $\perp$ to indicate that no tool is being held by the machine currently), and $\theta$ is the current rotation applied to the tool with respect to the volume. The volume $V_I$ in the initial state I is the negative of the part S with respect to its bounding box, T=$\perp$, and $\theta$=(0°,0°).

An action is a tuple $\langle V,T,\theta \rangle$, where V is the volume corresponding to Equation (3), that is, the maximal subvolume of the initial removal volume that can be removed using the tool T in orientation $\theta$. The effects of an action are described by the transition function $\tau(s,a)$ that, given a state s and an action a returns the successor state, s'. The transition function $\tau(s,a)$ can be expressed as:

$$\tau(\langle V_S, T_S, \theta_S \rangle, \langle V_a, T_a, \theta_a \rangle) = \langle V_S \setminus V_a, T_a, \theta_a \rangle \quad (5)$$

A selected action removes from the remaining volume V of the volume $V_a$ that the tool $T_a$ in the selected action can reach in its given orientation $\theta_a$. Note that the successor state s' assumes the tool $T_a$ and orientation $\theta_a$ of the action a. As a result, an action can imply a reorientation of the tool holder relative to the part, or, equivalently, a part orientation relative to the tool holder. This implicit change is taken into account by the cost function G(a,s), which recognizes that reorienting the part requires the expenditure of time, denoted $t_\theta(\theta_a,\theta_s)$, because an additional setup will be required. Similarly, if the tool does not have an automatic tool changer, then a tool change will also be required and will incur an additional time-cost, $t_T(T_a,T_s)$. The cost function can be expressed as:

$$C(\langle V_S, T_S, \theta_S \rangle, \langle V_a, T_a, \theta_a \rangle) = t_V(V_S \cap V_a, T_a) + t_T(T_a, T_s) + t_\theta(\theta_a, \theta_s) \quad (6)$$

where $t_V(V,T)$ is a function that estimates the time required to remove the volume V using tool T. The goal condition G(s) is met when the remaining volume is minimal or not substantial, that is, $G(\langle V_S, T_S, \theta_S \rangle) \equiv V_S = \emptyset$.

Figure 12:
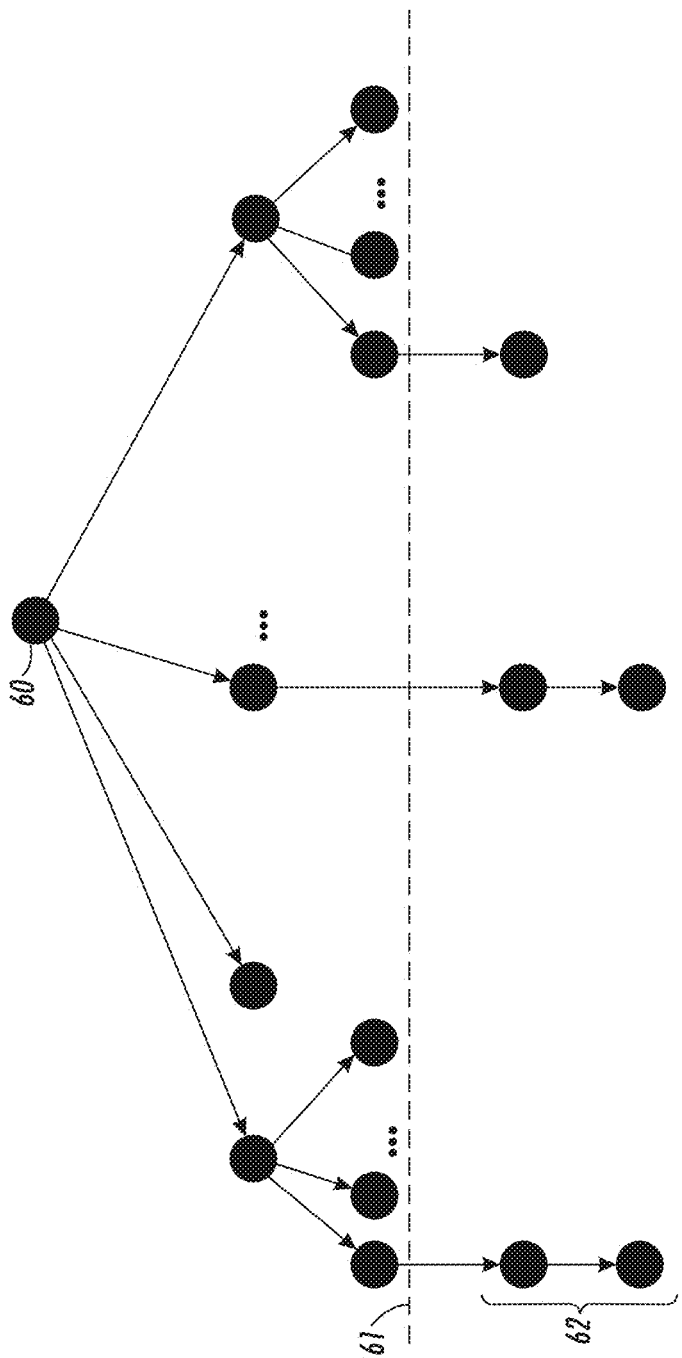
FIG. 12 is a diagram showing, by way of example, a search tree.

In practice, the search space for process planning problems is too large to search exhaustively. Only eight required access directions and five tools implies a ramification factor of 40, which means there are $40^{10} > 1e16$ different plans of length 10. The process planning problem is solved using a variant of weighted A* search using the remaining volume to construct a heuristic function that can effectively guide the search. Additionally, the search space is pruned by imposing an upper limit on the size of the open-set (or search frontier) to 1,000, although other upper limits could be used. FIG. 12 is a diagram showing, by way of example, a search tree. Searching begins at an initial state 60, which forms the root node of the tree. The upper limit at the search frontier 61 pares down the search space. At first, the search will branch out quickly, but subsequently becomes greedy and only considers the best successor, that is, the most cost effective, action to transition from each state until the goal condition 62 is met. In practice, this approach produces near-optimal plans because the heuristic is good at estimating the actual cost of removing the remaining material from the raw part or staging model. In a further embodiment, a pure greedy search can be run before running the variant of weighted A* search to establish an upper bound on the cost of the best plan. The greedy search is extremely fast, for instance, on the order of 0.1 seconds for a representation of removal volumes in grids with $200^3$ voxels, and the result can be used as a bound for branch-and-bound searches to prune candidate plans whose aggregate cost plus heuristic value already exceed the bound. Combining these measures allows process plans to be computed in usually less than 60 seconds for realistic 3-axis machined parts. Note that in comparison to feature-based approaches, where Boolean operations must be performed on boundary representations, the foregoing approach Boolean operations are reduced to operations on binary sets, which can be computed quickly.

Fixture planning is a largely experience-driven activity that focuses on determining precise workpiece clamping according to process constraints, such as collision avoidance with the moving tool, accessibility to specific locations, tolerances, and so on. Fixture planning is a key part of machining process planning, and offers significant scope for automation. Automatic workpiece holding using modular fixtures and vises will now be discussed with an emphasis on collision avoidance with moving tools. In particular, algorithms to compute maximal machinable volumes may be applied with some modifications to compute vise fixtures. Automatically generating modular fixtures is described in commonly-assigned U.S. Pat. No. 9,235,658, issued Jan. 12, 2016, the disclosure of which is incorporated by reference.

The salient points of automatic modular fixture configuration relevant to process planning will briefly be described. Assuming a polyhedral representation of staging models and the maximal machinable volume, the principles of force and form closure can be applied to assert that seven points on the boundary of the part, outside the machinable volume, are necessary and sufficient to grasp the staging model, such that the staging model remains immobile under external forces and moments. Essentially, unit forces applied to sample locations on the part boundary have an associated moment about the part centroid, and the six-tuple of the force and moment components defines a point or a wrench in a six-dimensional wrench space. Form closure is equivalent to the condition that the 6×7 wrench matrix, whose columns are sampled wrenches, has a null space with purely positive coefficients.

When friction between clamps and the part surface is considered, four points are sufficient to guarantee form closure. Tangent forces due to Coulomb friction may be used to generate null spaces with positive coefficients. The coefficients of the wrench matrix may be thought of as scaling factors applied to clamping forces, which are always bounded in practice. Therefore, under operating conditions, a form closure can be restricted to force closure, which bounds the total forces and moments that the fixtured part can withstand.

The chosen form/force closure configuration is then mapped to a catalog of modular fixtures, including several types of clamps, such as edge clamps, strap clamps, side clamps, and so on, and locator pins to choose the proper arrangement of clamps to avoid tool collisions. Modular fixtures offer the significant advantage of reconfigurability, but are often more expensive, labor-wise, for a shop to assemble compared to solutions using vises. In practice, vise fixturing is more popular because of setup convenience, but only provides force closure, which is usually sufficient for practical situations. A pair of parallel plates are mated against flat surfaces on the part and stock and positioned to maximize the frictional clamping forces, while ensuring that the cutting tool will not collide with any part of the vise. Given an orientation for the vise relative to the part, the vise jaws are treated like undercut free tools, so that z-buffer algorithms, as discussed supra, can be used with the addition of a counter to record the number of surface points of the vise that are coincident with the surface of the part.

The orientation of the vise relative to the part can be chosen based on many criteria; in one embodiment, the vise base is assumed to lie on a plane orthogonal to the tool access direction, and test orientations are chosen from the surface normals of the part, which are parallel to the base plane. Heuristics, such as surface area, can be used to greedily sort the test orientations. Furthermore, the fact that a vise jaw is flat and, generally, large relative to the part enables significant optimizations over checking of all surface points of the vise against all corresponding surface points of the part. To guarantee collision avoidance with the cutting tool, z-buffer maximum depth and overlap count from the perspective of both vise jaws and on both the part and the removal volume are determined. The (X,Y) translation, and corresponding vise opening, with the largest overlap with the part and zero overlap with the removal volume is selected.

While the invention has been particularly shown and described as referenced to the embodiments thereof, those skilled in the art will understand that the foregoing and other changes in form and detail may be made therein without departing from the spirit and scope of the invention.

What is claimed:

1. A system for planning of computer numerical control (CNC) machining operations with the aid of a digital computer, comprising:
    a storage device, comprising:
        a geometric model of a part to be machined, the geometric model defining surfaces of the part;
        parameters for a plurality of CNC machining tools, the parameters for each CNC machining tool comprising a plurality of orientations at which the CNC machining tool is able to longitudinally traverse a rotating cutting edge; and
        a maximal set of translations for each of the CNC machining tools, each translation comprising one of the orientations of the CNC machining tool where the CNC machining tool's orientation will avoid collisions between the rotating cutting edge and the surfaces of the part and a maximal sub-volume of material removable from the part by the CNC machining tool in the CNC machining tool's orientation for the translation; and
    a processor and memory within which code for execution by the processor is stored, further comprising:
        a search engine, comprising:
            a set of states, each state identifying one of the CNC machining tools, one of the orientations of the CNC machining tool, and each of the states describing a negative volume of the part, with one of the states representing an initial state;
            a set of actions, each action identifying one of the CNC machining tools, one of the orientations of the CNC machining tool, and each of the actions describing the maximal sub-volume of material removable from the negative volume of the part in one of the states by the CNC machining tool in the CNC machining tool's orientation; and
            a transition module configured to repetitively transition, starting at the initial state, from one of the states to another of the states until a goal condition is met by choosing one of the actions as guided by a heuristic that is based on an aggregate cost associated with the chosen actions and the negative volume that remains after subtracting the maximal sub-volume for the action chosen;
        a process planner configured to form a process plan comprising each of the actions chosen when the negative volume that remains is minimal;
        a programming module configured to program at least one of the CNC machining tools with the process plan downloaded and comprising machining operations by the CNC machining tool based on the process plan; and
    the at least one CNC machining tool configured to operate per the machining operations in the downloaded process plans by machining off the part the maximal sub-volumes through traversals of the rotating cutting edge over the surfaces of the part.

2. A system according to claim 1, wherein the initial state is defined as comprising none of the CNC machining tools, no orientations of any of the CNC machining tools, and describing a negative volume of the part prior to any machining by any of the CNC machining tools.

3. A system according to claim 1, wherein the aggregate cost is based on a cost constraint and the cost constraint is expressed as a function of the time to remove from the part the maximal sub-volume of material removable for the action chosen.

4. A system according to claim 3, wherein the cost constraint is adjusted as a function of the time taken to change from the CNC machining tool for the one state to the CNC machining tool for the action chosen.

5. A system according to claim 4, wherein the cost constraint is adjusted as a function of the time taken to change the orientation of the CNC machining tool for the one state to the orientation of the CNC machining tool for the action chosen.

6. A system according to claim 5, wherein the cost constraint C is determined in accordance with the equation:

$$C(\langle V_S, T_S, \theta_S \rangle, \langle V_a, T_a, \theta_a \rangle) = t_V(V_S \cap V_a T_a) + t_T(T_a, T_S) + t_\theta(\theta_a, \theta_S)$$

where $V_S$ is the negative volume of the part in state S, $T_S$ is the CNC machining tool in state S, $\theta_S$ is the orientation of the CNC machining tool in state S, $V_a$ is the maximal sub-volume of material removable for action a, $T_a$ is the CNC machining tool for action a, $\theta_a$ is the orientation of the CNC machining tool for action a, $t_V(V,T)$ is the time to remove from the part the maximal sub-volume of material removable for the action chosen, $t_T(T_a, T_S)$ is the time taken to change from the CNC machining tool for the one state to the CNC machining tool for the action chosen, and $t_\theta(\theta_a, \theta_S)$ is the time taken to change the orientation of the CNC machining tool for the one state to the orientation of the CNC machining tool for the action chosen.

7. A system according to claim 1, wherein an upper limit is imposed on a size of a search frontier comprised of the set of other states transitionable from the one state based on the set of actions.

8. A system according to claim 1, further comprising:
    a greedy search module configured to set an upper bound based on a pure greedy search through the set of states and to prune transitions from the one state those actions comprising a cost constraint that exceed the upper bound.

9. A system according to claim 1, the search engine further comprising:
a multiple plan generator configured to perform the repetitive transitioning for a plurality of process plans and to provide a subset of the plurality of process plans as qualitatively distinct.

10. A system according to claim 1, wherein at least one of the negative volume of the part and the maximal sub-volume of material removable are selected from the group comprising features, slices, polygons, and voxels.

11. A system according to claim 1, wherein the repetitive transitioning is expressed as a weighted A* search.

12. A method for planning of computer numerical control (CNC) machining operations with the aid of a digital computer, comprising the steps of:
providing a computer comprising a processor, memory and storage with a geometric model of a part to be machined, the geometric model defining surfaces of the part;
providing the computer with parameters for a plurality of CNC machining tools, the parameters for each CNC machining tool comprising a plurality of orientations at which the CNC machining tool is able to longitudinally traverse a rotating cutting edge;
providing the computer with a maximal set of translations for each of the CNC machining tools, each translation comprising one of the orientations of the CNC machining tool where the CNC machining tool's orientation will avoid collisions between the rotating cutting edge and the surfaces of the part and a maximal sub-volume of material removable from the part by the CNC machining tool in the CNC machining tool's orientation for the translation;
representing in the computer a set of states, each state identifying one of the CNC machining tools, one of the orientations of the CNC machining tool, and each of the states describing a negative volume of the part, with one of the states representing an initial state;
representing in the computer a set of actions, each action identifying one of the CNC machining tools, one of the orientations of the CNC machining tool, and each of the actions describing the maximal sub-volume of material removable from the negative volume of the part in one of the states by the CNC machining tool in the CNC machining tool's orientation;
repetitively transitioning, starting at the initial state, by the computer from one of the states to another of the states until a goal condition is met by choosing one of the actions as guided by a heuristic that is based on an aggregate cost associated with the chosen actions and the negative volume that remains after subtracting the maximal sub-volume for the action chosen;
forming by the computer a process plan comprising each of the actions chosen when the negative volume that remains is minimal;
programming at least one of the CNC machining tools with the process plan downloaded by the computer and comprising machining operations by the CNC machining tool based on the process plan; and
performing by the at least one CNC machining tool the machining operations in the downloaded process plans by machining off the part the maximal sub-volumes through traversals of the rotating cutting edge over the surfaces of the part.

13. A method according to claim 12, further comprising the steps of:
defining in the computer the initial state as comprising none of the CNC machining tools, no orientations of any of the CNC machining tools, and describing a negative volume of the part prior to any machining by any of the CNC machining tools.

14. A method according to claim 12, wherein the aggregate cost is based on a cost constraint, further comprising the step of:
expressing in the computer the cost constraint as a function of the time to remove from the part the maximal sub-volume of material removable for the action chosen.

15. A method according to claim 14, further comprising the step of:
adjusting in the computer the cost constraint as a function of the time taken to change from the CNC machining tool for the one state to the CNC machining tool for the action chosen.

16. A method according to claim 15, further comprising the step of:
adjusting in the computer the cost constraint as a function of the time taken to change the orientation of the CNC machining tool for the one state to the orientation of the CNC machining tool for the action chosen.

17. A method according to claim 16, further comprising the step of:
determining the cost constraint C in accordance with the equation:

$$C(\langle V_S, T_S, \theta_S \rangle, \langle V_a, T_a, \theta_a \rangle) = t_V(V_S \cap V_a T_a) + t_T(T_a, T_S) + t_\theta(\theta_a, \theta_S)$$

where $V_S$ is the negative volume of the part in state S, $T_S$ is the CNC machining tool in state S, $\theta_S$ is the orientation of the CNC machining tool in state S, $V_a$ is the maximal sub-volume of material removable for action a, $T_a$ is the CNC machining tool for action a, $\theta_a$ is the orientation of the CNC machining tool for action a, $t_V(V,T)$ is the time to remove from the part the maximal sub-volume of material removable for the action chosen, $t_T(T_a, T_S)$ is the time taken to change from the CNC machining tool for the one state to the CNC machining tool for the action chosen, and $t_\theta(\theta_a, \theta_S)$ is the time taken to change the orientation of the CNC machining tool for the one state to the orientation of the CNC machining tool for the action chosen.

18. A method according to claim 12, further comprising the step of:
imposing in the computer an upper limit on a size of a search frontier comprised of the set of other states transitionable from the one state based on the set of actions.

19. A method according to claim 12, further comprising the steps of:
setting in the computer an upper bound based on a pure greedy search through the set of states; and
pruning transitions from the one state those actions comprising a cost constraint that exceed the upper bound.

20. A method according to claim 12, further comprising the steps of:
performing in the computer the repetitive transitioning for a plurality of process plans; and
providing in the computer a subset of the plurality of process plans as qualitatively distinct.

21. A method according to claim 12, wherein at least one of the negative volume of the part and the maximal sub-volume of material removable are selected from the group comprising features, slices, polygons, and voxels.

22. A method according to claim 12, further comprising the steps of:
- expressing in the computer the repetitive transitioning as a weighted A* search.

23. A non-transitory computer readable storage medium storing code for executing on a computer system to perform the method according to claim 12.

* * * * *